United States Patent [19]

Too

[11] Patent Number: 5,233,688
[45] Date of Patent: Aug. 3, 1993

[54] METHOD AND APPARATUS FOR PROCESS MONITORING AND METHOD OF CONSTRUCTING NETWORK DIAGRAM FOR PROCESS MONITORING

[75] Inventor: Shigeyuki Too, Fuchu, Japan

[73] Assignee: Kabushiki Kaisha Toshiba, Kawasaki, Japan

[21] Appl. No.: 841,259

[22] Filed: Feb. 24, 1992

Related U.S. Application Data

[63] Continuation of Ser. No. 330,616, Mar. 30, 1989, abandoned.

[30] Foreign Application Priority Data

Mar. 31, 1988 [JP] Japan .................. 63-76529

[51] Int. Cl.⁵ ............................. G06F 15/00
[52] U.S. Cl. ................... 395/161; 395/155; 340/747; 340/706
[58] Field of Search ................ 395/155, 161, 140; 340/747, 706, 750; 382/46, 56

[56] References Cited

U.S. PATENT DOCUMENTS 4,700,238 10/1987 Sugiyama ................ 358/300
4,754,428 6/1988 Schultz et al. ............ 364/900
4,849,906 7/1989 Chodos et al. ............ 364/516
4,873,623 10/1989 Lane et al. ............... 364/188

*Primary Examiner*—Phu K. Nguyen
*Attorney, Agent, or Firm*—Foley & Lardner

[57] ABSTRACT

A method and an apparatus for process monitoring which can cope with changes in a configuration of the system it monitors easily and flexibly. The method includes the steps of modifiably memorizing network information indicating connections among the processes; and constructing a network diagram in accordance with the network information in the modifiably memorizing means, automatically. Apparatus for performing the method is also disclosed. Also a method of constructing a network diagram for process monitoring which can be modified to incorporate changes in a configuration of the system being monitored easily and flexibly. The method includes the steps of placing the longest sequence straight; and placing other shorter sequences that run parallel to the longest sequence around the longest sequence in the order of their length starting from the longest sequence to away from the longest sequence.

12 Claims, 8 Drawing Sheets

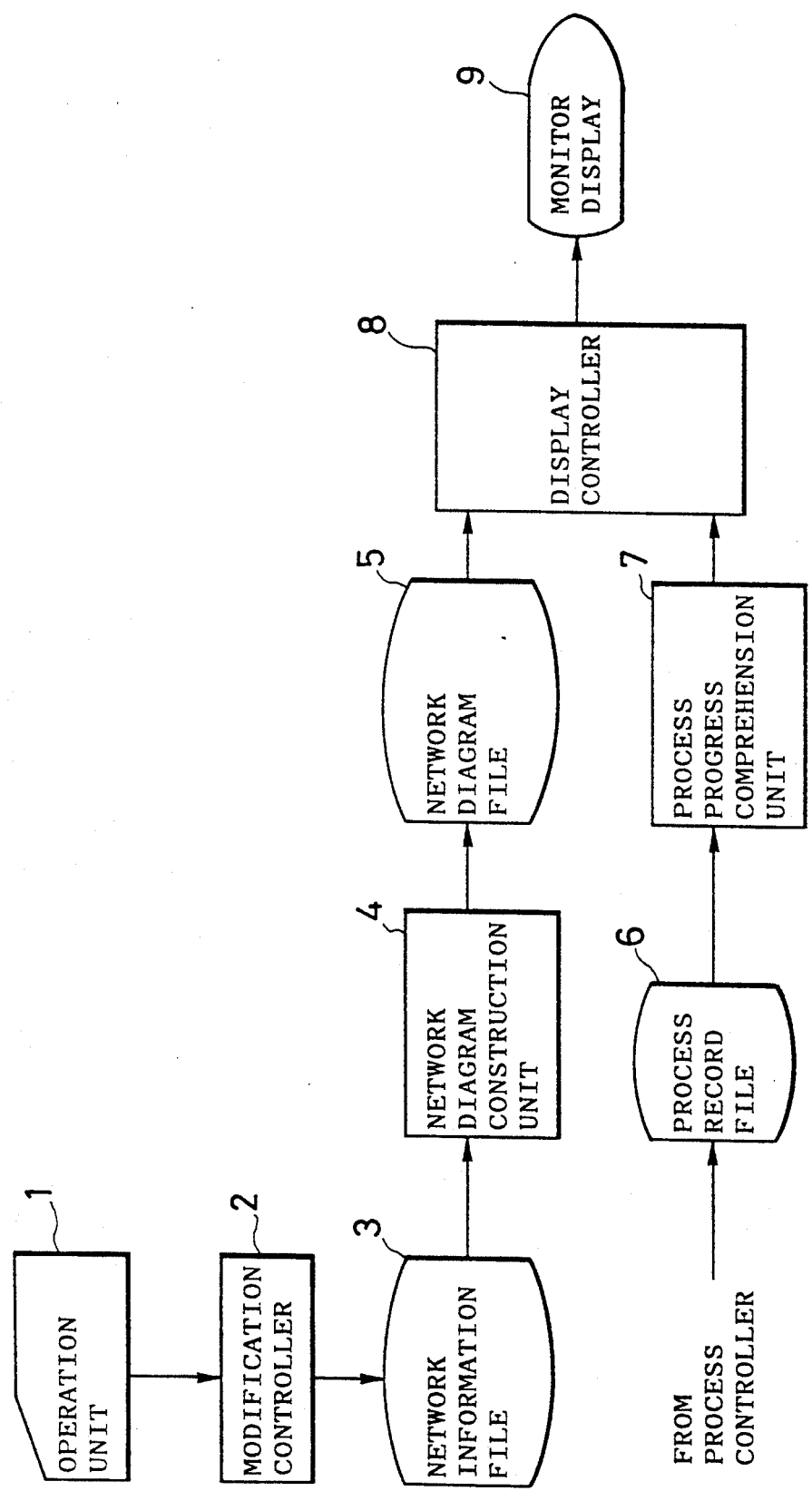

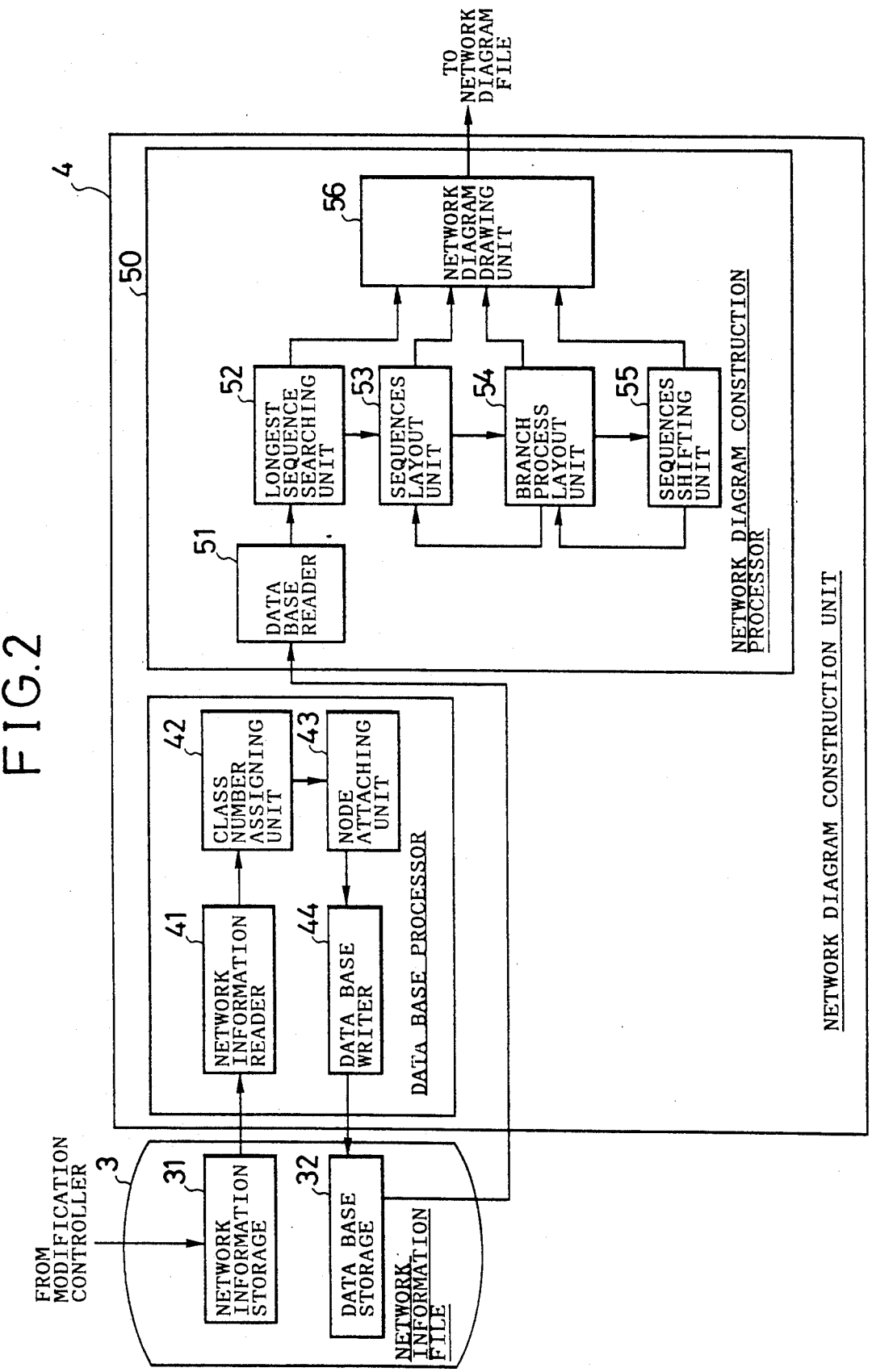

FIG.3

| CURRENT PROCESS | RELATION | RELATED PROCESS | CURRENT PROCESS | RELATION | RELATED PROCESS |
|---|---|---|---|---|---|
| A52NG | C |  | A67RA | C |  |
| A61JA | C |  | A67RA | F | A66RA |
| A61JA | B | A62JA | A67RA | B | A71RC |
| A61JA | B | A71JN | A67RA | B | A72RA |
| A61RA | C |  | A67RA | B | A72RC |
| A61RA | B | A62RA | A67RA | B | A98RA |
| A62JA | F | A61JA | A67RA | B | A99RA |
| A62JA | B | A63JA | A71JE | C |  |
| A62RA | C |  | A71JE | F | A64JA |
| A62RA | F | A61RA | A71JN | C |  |
| A62RA | B | A63RA | A71JN | F | A61JA |
| A62RA | B | A71RB | A71RB | C |  |
| A62RA | B | A71RG | A71RB | F | A62RA |
| A63JA | C |  | A71RB | B | A64RA |
| A63JA | F | A62JA | A71RB | B | A72RA |
| A63JA | B | A64JA | A71RC | C |  |
| A63RA | C |  | A71RC | F | A67RA |
| A63RA | F | A62RA | A71RG | C |  |
| A63RA | B | A64RA | A71RG | F | A62RA |
| A64JA | C |  | A71RG | B | A64RA |
| A64JA | F | A63JA | A72RA | C |  |
| A64JA | B | A71JE | A72RA | F | A67RA |
| A64RA | C |  | A72RA | F | A71RB |
| A64RA | F | A63RA | A72RC | C |  |
| A64RA | B | A66RA | A72RC | F | A67RA |
| A66RA | C |  | A98RA | C |  |
| A66RA | F | A64RA | A98RA | F | A67RA |
| A66RA | B | A67RA | A99RA | C |  |
|  |  |  | A99RA | F | A67RA |

RELATIONS

C:CURRENT PROCESS
F:PRECEDING PROCESS
B:FOLLOWING PROCESS

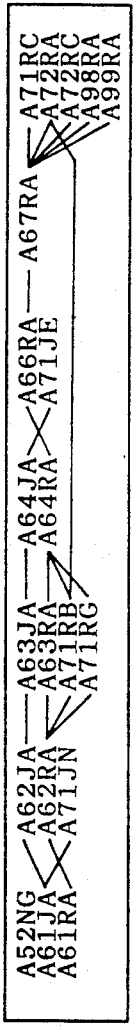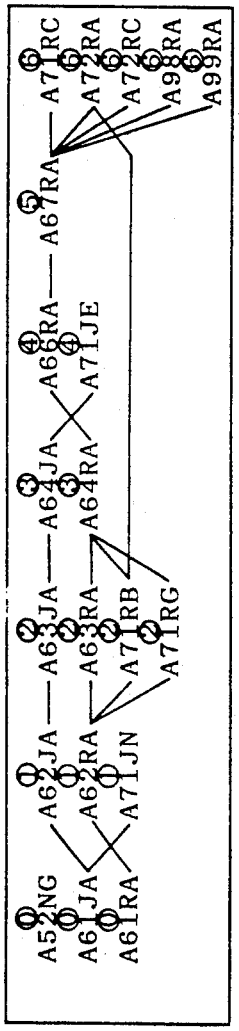
FIG.5(A)
FIG.5(B)
FIG.5(C)
FIG.5(D)

FIG.5(E)

|   | 0 | 1 | 2 | 3 | 4 | 5 | 6 | 7 |
|---|---|---|---|---|---|---|---|---|
| 1 ⎰ 25 ⎱ 49 | A61RA —A62RA —A63RA —A64RA —A66RA —A67RA —A71RC | | | | | | | |

FIG.5(F)

|   | 0 | 1 | 2 | 3 | 4 | 5 | 6 | 7 |
|---|---|---|---|---|---|---|---|---|
| 1 | A61JA | | | | | | | |
| ⎰ 25 ⎱ | A61RA —A62RA —A63RA —A64RA —A66RA —A71JA —A71RC | | | | | | | |
| 49 | A52NG | | | | | | | |

FIG.5(G)

|   | 0 | 1 | 2 | 3 | 4 | 5 | 6 | 7 |
|---|---|---|---|---|---|---|---|---|
| 1 | A61JA —A62JA —A63JA —A64JA —A71JE | | | | | | | |
| ⎰ 25 | A61RA —A62RA —A63RA —A64RA —A66RA —A67RA —A71RC | | | | | | | |
| ⎱ 49 | A52NG | | | | | | | |

METHOD AND APPARATUS FOR PROCESS MONITORING AND METHOD OF CONSTRUCTING NETWORK DIAGRAM FOR PROCESS MONITORING

This application is a continuation of application Ser. No. 07/330,616, filed Mar. 30, 1989, now abandoned.

BACKGROUND OF THE INVENTION

1. Field of the Invention

The present invention relates to a method and an apparatus for process monitoring which monitors a flow of operations by control system comprised of plurality of processes combined functionally, and to a method of constructing a network diagram to be utilized by such a process monitor.

2. Description of the Background Art

Conventionally, a control system comprising plurality of processes, such as JOB in a computer, combined and coordinated functionally is equipped with a process monitor device in order to monitor a flow of operations.

In such a control system equipped with a process monitor, a network diagram indicating operative relationships among processes is displayed along with information concerning states of operation of each process coming from a process controller, so that an operator can readily comprehends progress and current situation of the operation by the system.

However, such a conventional control system has a fixed network diagram devised for an original configuration of the system, so that whenever the configuration of the system is to be modified, such that for instance the order of processes need to be revised or the relationships among processes need to be altered, another network diagram has to be devised newly by a manufacturer, which requires a great amount of works and time to be tolerated by a user.

SUMMARY OF THE INVENTION

It is therefore an object of the present invention to provide a method and an apparatus for process monitoring which can cope with changes in a configuration of the system it monitors easily and flexibly.

Another object of the present invention is to provide a method of constructing a network diagram for process monitoring which can be modified to incorporate changes in a configuration of the system being monitored easily and flexibly.

According to one aspect of the present invention there is provided an apparatus for process monitoring which monitors operation of a system formed by coordinating plurality of processes functionally, comprising: means for modifiably memorizing network information indicating connections among the processes; means for modifying the network information in the modifiably memorizing means; means for constructing a network diagram in accordance with the network information in the modifiably memorizing means, automatically; and means for displaying the constructed network diagram along with status of the processes concerning their progresses.

According to another aspect of the present invention there is provided a method of process monitoring which monitors operation of a system formed by coordinating plurality of processes functionally, comprising the steps of: modifiably memorizing network information indicating connections among the processes; modifying the network information in the modifiably memorizing means; constructing a network diagram in accordance with the network information in the modifiably memorizing means, automatically; and displaying the constructed network diagram along with status of the processes concerning their progresses.

According to another aspect of the present invention there is provided a method of constructing a network diagram indicating indicating connections among plurality of processes to be coordinated functionally together into a system, from given network information indicating connections among the processes; comprising the steps of: tracing all sequences of the processes in accordance with the network information; finding one sequence which is the longest; placing the longest sequence straight; and placing other shorter sequences that run parallel to the longest sequence around the longest sequence in the order of their length starting from the longest sequence to away from the longest sequence.

Other features and advantages of the present invention will become apparent from the following description taken in conjunction with the accompanying drawings.

BRIEF DESCRIPTION OF THE DRAWINGS

FIG. 1 is a schematic block diagram of one embodiment of a process monitor according to the present invention.

FIG. 2 is a detailed block diagram of a network information file and a network diagram construction unit of the process monitor of FIG. 1.

FIG. 3 is an example of network information to be entered by an operator to the process monitor of FIG. 1 in tabular form.

FIG. 5 shows a series of diagrammatic illustration for explaining the manner of producing network diagram by the process monitor of FIG. 1, of which:

FIG. 5(A) is a network diagram produced in a conventional manner;

FIG. 5(B) is a network diagram of FIG. 3(A) with class numbers given;

FIG. 5(C) is a table of component processes arranged by their class numbers;

FIG. 5(D) is another table of component processes arranged by their class numbers accompanied by indications of the class numbers of immediately following processes;

FIGS. 5(E), (F), and (G) are serial illustrations for explaining the manner of constructing network diagram;

DETAILED DESCRIPTION OF THE PREFERRED EMBODIMENTS

Figure 4:
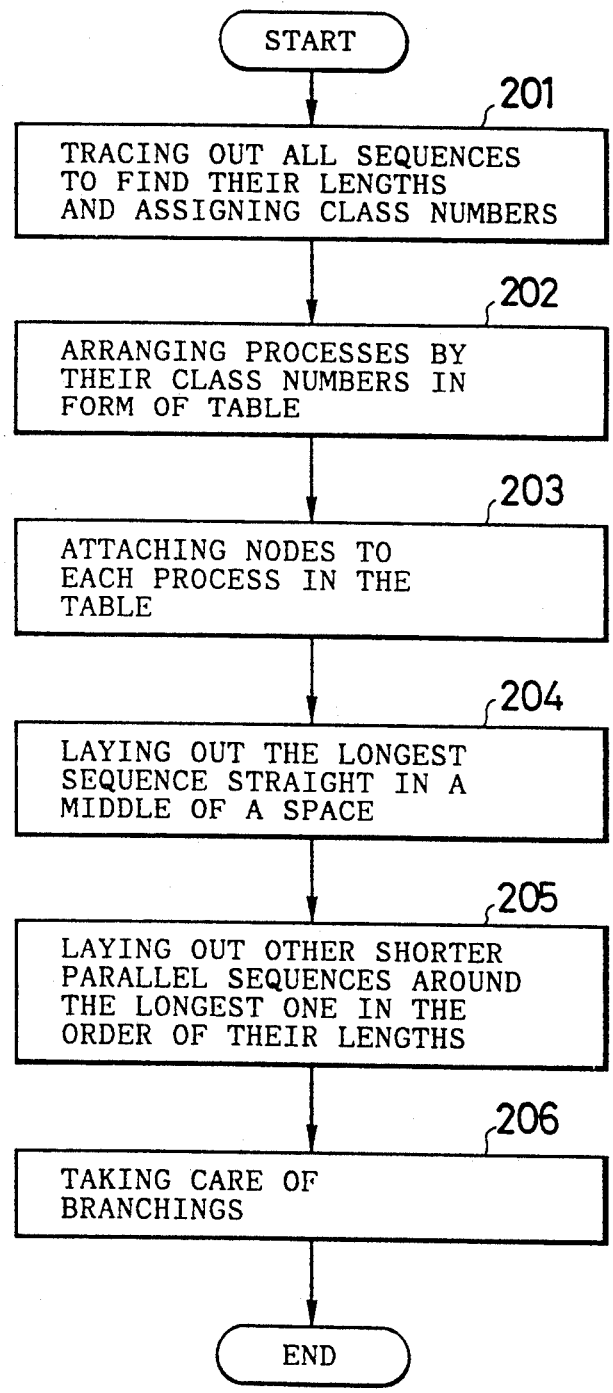
FIG. 4 is a flow chart for the operation of constructing a network diagram by the process monitor shown in FIG. 1.

Referring now to FIG. 1, there is shown one embodiment of a process monitor for an control system according to the present invention.

This process monitor is comprised of the following.

An operation unit 1 includes a keyboard and a VDT(video display terminal) which is to be operated by an operator in modifying a network information.

A modification controller 2 actually modifies the network information in a network information file 3 in accordance with commands given at the operation unit 1. This modification controller also provides various displays for assisting the operator to enter the commands, to be displayed on the VDT of the operation unit 1.

A network information file 3 is a file which memorizes the network information, i.e., connections among various component processes, in a modifiable manner. Thus, an entry of this network information file 3 contains each information in a form of [immediately preceding processes name—current process name—immediately following processes name].

A network diagram construction unit 4 constructs a network diagram according to the network information and the connections among various component processes expounded in the network information, automatically. As explained in detail below, this network diagram construction unit 4 constructs the network diagram by first tracing all connections among the component processes to find length of each sequence, i.e., a string, of processes, then by placing the longest sequence straight in a middle and other shorter sequences that run parallel to the longest one around the longest one in the order of their length starting from the longest one to away from the longest one.

A network diagram file 5 memorizes the network diagram constructed by the network diagram construction unit 4.

A process record file 6 memorizes the current status of each process in four categories of waiting, processing normally, processing with malfunction, and processed. Such status of the processes are kept update by signals from a process controller which actually operates and supervises the operations of the processes.

A process progress comprehension unit 7 searches through the process record file 6, checks progress of each process, and prepares image information indicating the progresses using colors to distinguish different status, which will be explained in detail below.

A display controller 8 incorporates the colored image information from the process progress comprehension unit 7 into the network diagram from the network diagram file 5, the result of which is to be shown at the monitor display 9 for the monitoring by the operator.

A detail of the network information file 3 and the network diagram construction unit 4 is shown in FIG. 2.

The network information file 3 includes a network information storage 31 which stores the network information enterring from the modification controller 2, and a data base storage 32 which stores the network information along with various additional information necessary in constructing the network diagram which are derived from and attached to the network information by the network diagram construction unit 4.

The network diagram construction unit 4 includes a data base processor 40 which derives and attaches the various additional information necessary in constructing the network diagram to make up the data base to be stored in the data base storage 32 of the network information file 3, and the network diagram construction processor 50 which actually constructs the network diagram on a basis of the data base stored in the data base storage 32 of the network information file 3.

The data base processor 40 further includes a network information reader 41 which reads out the network information stored in the network information storage 31 of the network information file 3, a class number assigning unit 42 which assigns to each process a class number indicating the order in which that process appear in a sequence it belongs to, a node attaching unit 43 which attaches to each process a node indicating the processes immediately following that process, and a data base writer 44 which writes the data base containing the network information along with the assigned class numbers and the attached nodes into the data base storage 32 of the network information file 3.

On the other hand, the network diagram construction unit 50 further includes a data base reader 51 which reads out the data base stored in the data base storage 32 of the network information file 3, a longest sequence searching unit 52 which searches out the longest sequence among the processes, a sequence layout unit 53 which lays out all the separate sequences among the processes, a branch process layout unit 54 which lays out all the branch processes of the precesses in the sequences laid out by the sequence layout unit 53, a sequences shifting unit 55 which shifts sequences up and down in order to avoid overlaps between the adjacent sequences and their branch processes, and a network diagram drawing unit 56 which actually draw the network diagram to be stored in the network diagram file 5 in accordance with the longest sequence searching unit 52, the sequences layout unit 53, the branch process layout unit 54, and the sequences shifting unit 55.

Now, the operation of this process monitor will be explained using FIGS. 4, 5, 6, and 7. Here, the operation will be described for an exemplary case of modifying the network processes due to changes in the configuration of the control system.

In such a case, it is necessary first for the operator to enter new network information corresponding to the new configuration of the control system, using the keyboard and VDT of the operation unit 1. Since, in this embodiment, the network information can be specified by simply specifying the immediately preceding processes and the immediately following processes for each process, this entering of the new network information can easily be accomplished by the operator. An example of such network information to be entered by the operator is shown in FIG. 3 in tabular form. As shown in FIG. 3, the operator needs to specify only the immediately preceding processes and the immediately following processes for each process which will be recorded in the network information file 3 with an appropriate relation.

In response to this entering of the new network information, the old network information in the network information file 3 is modified by the modification controller 2.

Then, the network diagram construction unit 4 constructs a new network diagram according to the network information and the connections among various component processes expounded in the network information automatically. This construction of the new network diagram will now be explained in detail, using FIGS. 4 and 5.

Figure 5H:
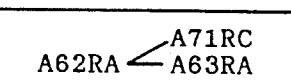
FIGS. 5(H), (I), and (J) are illustration of potentially problematic part of the network diagram for explaining the manner of coping with the problem.
Figure 5I:
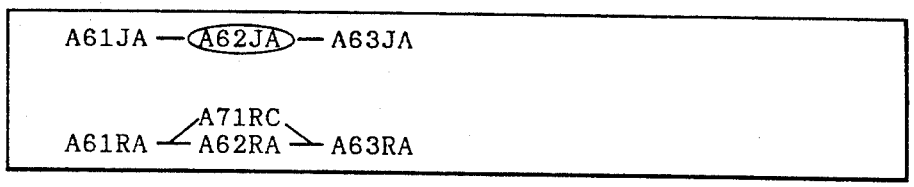
Figure 5J:
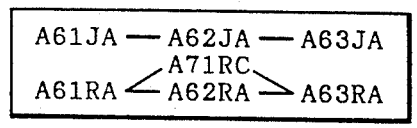
Figure 5K:
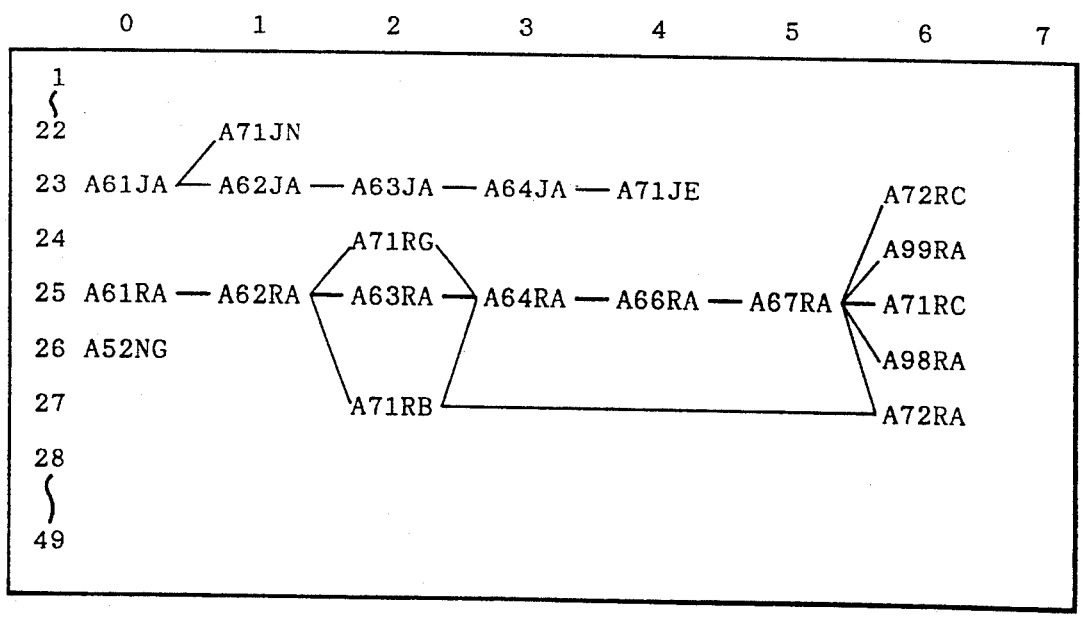
FIG. 5(K) is a final form of the network diagram produced.

Here, for the sake of clarity it is assumed that the network diagram constructed by a conventional method looks as shown in FIG. 5(A), in which elements such as A52NG, A61JA and A62JA are process names and connections among these elements are indicated by line segments joining them. One of the drawbacks of such a conventional network diagram, apart from that it cannot be constructed automatically and that it cannot be easily modified, is that it looks rather untidy and even confusing. This drawback of the conventional network diagram can also be rectified in this embodiment, such that eventually a lucid and orderly network diagram as shown in FIG. 5(K) is obtainable.

First of all, at the step 201, after the network information is read out by the network information reader 41, all connections among the component processes are traced out to find length of each sequence of processes, and such a tracing goes along as the class numbers indicating the order within each sequence of processes are assigned to the processes by the lass number assigning unit 42. These class number are shown in FIG. 5(B) on top of each element as an encircled numeral, where those process at a top of a sequence are given a class number 0, next ones 1, and so on.

Then, at the step 202, the processes are put in a table of a form shown in FIG. 5(C), arranged by their class numbers by the class number assigning unit 42. Namely, columns are labeled by the class numbers in ascending order, such that all those processes in the column labeled 0 share the class number 0. Rows merely stands for the number of processes with common class number.

Next, at the step 203, the nodes indicating the locations in the table of the processes immediately following are attached to each process by the node attaching unit 43, as shown in FIG. 5(D). Namely, a node is given in a form "class number(column)—row", so that the node "0-0" for the process A52NG indicates that no process follows this A52NG, and the nodes "1-1, 1-3" for the process A61JA indicate that the processes of the class number 0 in the row 1 and row 3, i.e., the processes A62JA and A71JN are following this process A61JA. The resulting network information along with the assigned class numbers and the attached nodes is written by the data base writer 44 as the data base into the data base storage 32 of the network information file 3.

Then, after the data base in the data base storage 32 is read out by the data base reader 51, at the step 204, the longest sequence (which involves the largest number of processes) is searched out and laid out straight in the middle of a space by the longest sequence searching unit 52, as shown in FIG. 5(E). In this example the longest sequence is the one involving seven processes starting from the process A61RA and ending with the process A71RC, which is placed at the row 25 of the space with forty-nine rows.

Then, at the step 205, other processes with the class number 0 are placed either above or below A61RA at the top of the longest sequence by the sequences layout unit 53, as shown in FIG. 5(F), and the sequences starting from these processes are laid out, as shown in FIG. 5(G), such that other shorter sequences that run parallel to the longest one are placed around the longest one in the order of their length starting from the longest one to away from the longest one.

Next, at the step 206, branchings where more than one processes following one particular process or more than one processes proceeding to one particular process are taken care of. Here, the branch processes of the sequences are laid out by the branch process layout unit 54. Now, since at the step 205 all the parallel sequences are laid out without any gap in between, a branching such as one shown in FIG. 5(H) which occurs in the central longest sequences cannot be incorporated as it is, because, as shown in FIG. 5(I), the branch process A71RC will overlap with the process A62JA belonging to another sequence laying immediately above. This situation is handled by the sequences shifting unit 55 by shifting a whole sequence starting from the process A61JA one row upward, to make a room for the branch process A71RC to come in, as shown in FIG. 5(J). Obvious generalization of this procedure will be carried out in other similar circumstances to make a room for branch processes when necessary and as much as necessary. The room is to be made by shifting shorter sequences away from the longest one.

When all the branchings of all the sequences are taken care of in this manner, the network diagram shown in FIG. 5(K) will come out from the network diagram drawing unit 56.

The network diagram constructed in this manner is then memorized by the network diagram file 5.

Figure 6:
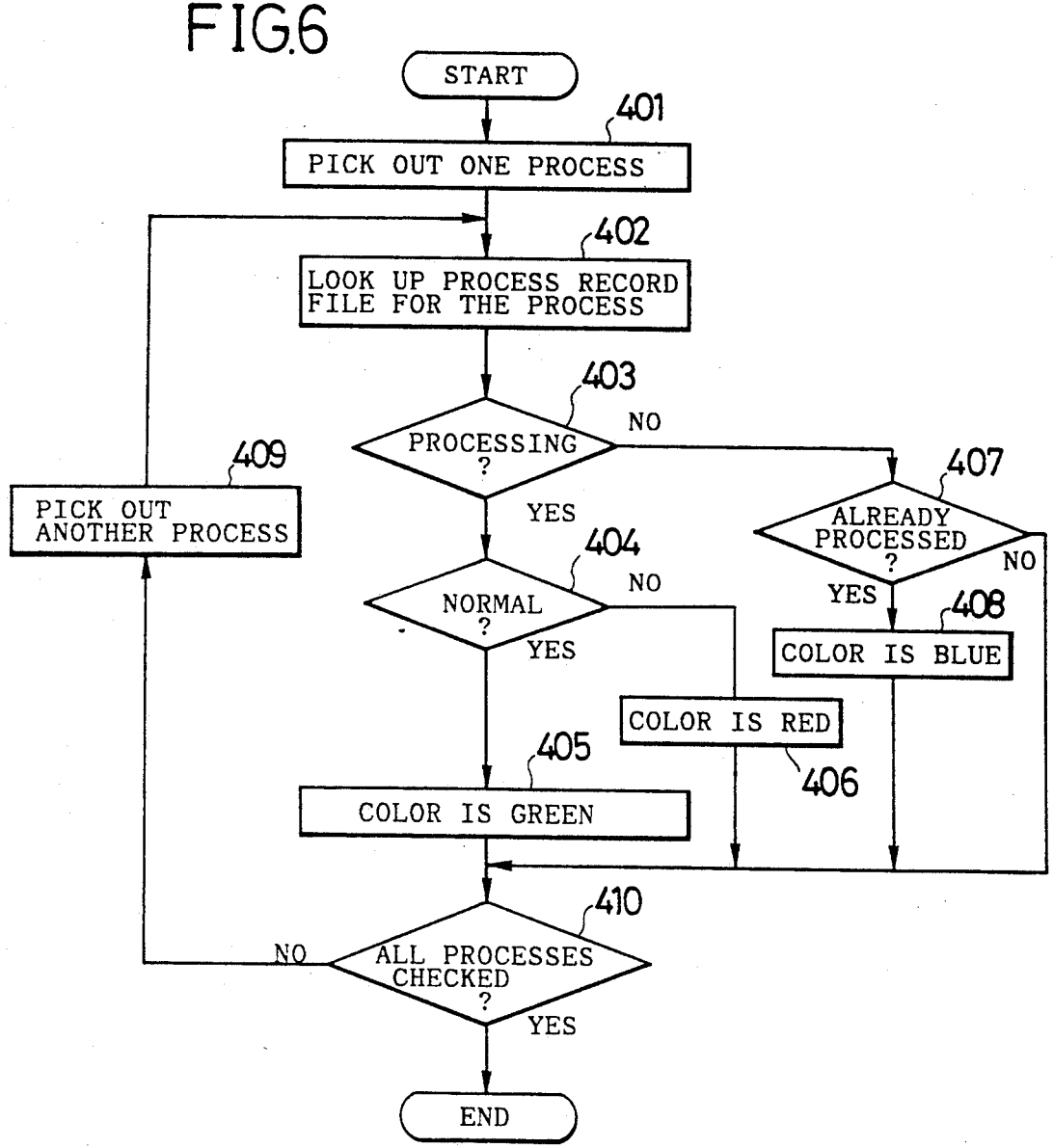
FIG. 6 is a flow chart for the operation of process progress comprehension unit of the process monitor of FIG. 1.

On the other hand, the process progress comprehension unit 7 continues to search through the process record file 6, check progress of each process, and prepare image information indicating the progresses using colors to distinguish different status, which is carried out according to the flow chart shown in FIG. 6.

First, one process is picked out at the step 401, and record of this process in the process record file 6 is looks up at the step 402.

Then at the step 403, whether the process is in a course of being processed is determined. When this is so the step 404 will be taken next, whereas otherwise the step 407 will be taken.

When the step 404 is taken, whether processing of the process is progressing normally or with malfunction is determined there. In case of the former the step 405 will be taken at which the color of the process on the network diagram is determined as green. In case of the latter the step 406 will be taken at which the color of the process on the network diagram is determined as red.

When the step 407 is taken, whether the process has already be processed is determined there. When this is so the step 408 will be taken at which the color of the process on the network diagram is determined as blue. Otherwise the process is still waiting so that the color will not be given.

When the step 407 is in the negative, as well as when any of the steps 405, 406, and 408 has been taken, the step 410 will be taken next, at which whether all the processes has been checked is determined. When this is so the operation terminates, whereas otherwise the step 409 will be taken at which another process is picked out and all the steps from the step 402 are repeated for this another process.

When the operation terminates once, a whole operation from the start to the end will be continually repeated over and over, so that the coloring of the network diagram is kept updated.

Figure 7:
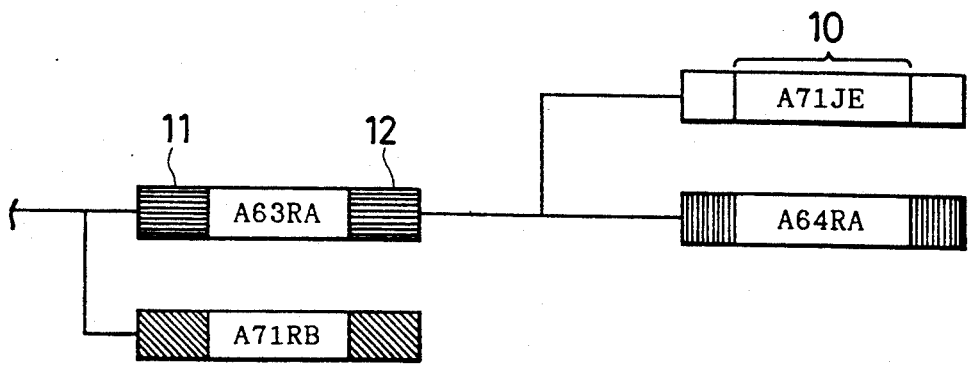
FIG. 7 is a illustration of a part of the network diagram as displayed with colors by the process monitor of FIG. 1.

The coloring of the network diagram determined in this manner is given to the display controller 8 in the form of the colored image information, which incorporates this colored image information from the process progress comprehension unit 7 into the network diagram from the network diagram file 5. The result of this will be shown at the monitor display 9 for the monitoring by the operator. This incorporation of colored image information can be accomplished, for example as shown in FIG. 7, by attaching to a window 10 for process name, two windows 11 and 12 which shows an appropriate color for the process.

As explained, according to this embodiment, it is possible for a process monitoring to cope with changes in a configuration of the system it monitors easily and flexibly.

Moreover, according to this embodiment, it is also possible to construct a network diagram for process monitoring which can be modified to incorporate changes in a configuration of the system being monitored easily and flexibly. In particular, such a network diagram can be constructed automatically, and in addition such a network diagram has a virtue of being lucid and orderly.

Furthermore, in this embodiment the colors are utilized to distinguish different status of the processes in order to further facilitating easy comprehension of the current situation by the operator.

It is to be noted that many modifications and variations of this embodiment may be made without departing from the novel and advantageous features of the present invention. Accordingly, all such modifications and variations are intended to be included within the scope of the appended claims.

What is claimed is:

1. An apparatus for process monitoring, which monitors the operation of a system formed by coordinating a plurality of functionally related processes into an operational sequence, comprising:
    means for modifiably memorizing network information indicating functional relationships among the processes in the operational sequence, where the functional relationships determine different possible orders for executing the processes;
    means for modifying the network information in the memorizing means in order to change the functional relationships among the processes indicated by the network information;
    means for constructing a network diagram for graphically representing the operational sequence of the processes and the functional relationships among the processes in accordance with the modified network information in the memorizing means; and
    means for displaying the constructed network diagram along with the status of the processes concerning progress of the processes during actual execution of the processes along the operational sequence indicated by the constructed network diagram.

2. The apparatus of claim 1, wherein the status of the processes are specified in terms of colors, each color indicating a different status.

3. The apparatus of claim 1, wherein the constructing means constructs the network diagram by arranging sequences of the processes according to a number of processes involved in each sequence.

4. The apparatus of claim 3, wherein the constructing means includes:
    means for tracing all sequences of the processes given by the network information;
    means for finding one sequence which is the longest;
    means for placing the longest sequence along a straight line; and
    means for placing other shorter sequences that run parallel to the longest sequence around the longest sequence in the order of a length of each sequence starting from the longest sequence to away from the longest sequence.

5. The apparatus of method of claim 4, further comprising means for making a room for branching processes on any one sequence by shifting other sequences shorter than said one sequence away from the longest sequence.

6. A method of process monitoring which monitors the operation of a system formed by coordinating a plurality of functionally related processes into an operational sequence, comprising the steps of:
    modifiably memorizing network information indicating functional relationships among the processes in the operational sequence, where the functional relationships determine different possible orders for executing the processes;
    modifying the network information memorized at the memorizing step in order to change the functional relationships among the processes indicated by the network information;
    constructing a network diagram for graphically representing the operational sequence of the processes and the functional relationships among the processes in accordance with the modified network information memorized at the memorizing step and modified at the modifying step; and
    displaying the constructed network diagram along with the status of the processes concerning progress of the processes during actual execution of the processes along the operational sequence indicated by the constructed network diagram.

7. The method of claim 6, wherein the status of the processes are specified in terms of colors, each color indicating different status.

8. The method of claim 6, wherein at the constructing step the network diagram is constructed by arranging sequences of the processes according to a number of processes involved in each sequence.

9. The method of claim 8, wherein the constructing step includes the steps of:
    tracing all sequences of the processes given by the network information;
    finding one sequence which is the longest;
    placing the longest sequence along a straight line; and
    placing other shorter sequences that run parallel to the longest sequence around the longest sequence in the order of a length of each sequence starting from the longest sequence to away from the longest sequence.

10. The apparatus of method of claim 9, further comprising the step of making a room for branching process on any one sequence by shifting other sequences shorter than said one sequence away from the longest sequence.

11. A method of constructing a network diagram for graphically representing connections among a plurality of processes to be coordinated with each other into a system, from given network information indicating connections among the processes; comprising the steps of:
    tracing all sequences of the processes given by the network information;
    finding the sequence which is the longest;
    laying out the longest sequence in a straight line; and placing the other shorter sequences that run parallel to the longest sequence along the longest sequence in the order of the length of each sequence, starting at one end of the longest sequence with the second longest sequence and laying out the sequence in order of their lengths.

12. The method of claim 11, further comprising the step of making a room for branching process on any one sequence by shifting other sequences shorter than said one sequence away from the longest sequence.

* * * * *